T. J. SMITH.
Safety-Regulator for Pumps and Water Pipes.
No. 214,463. Patented April 15, 1879.
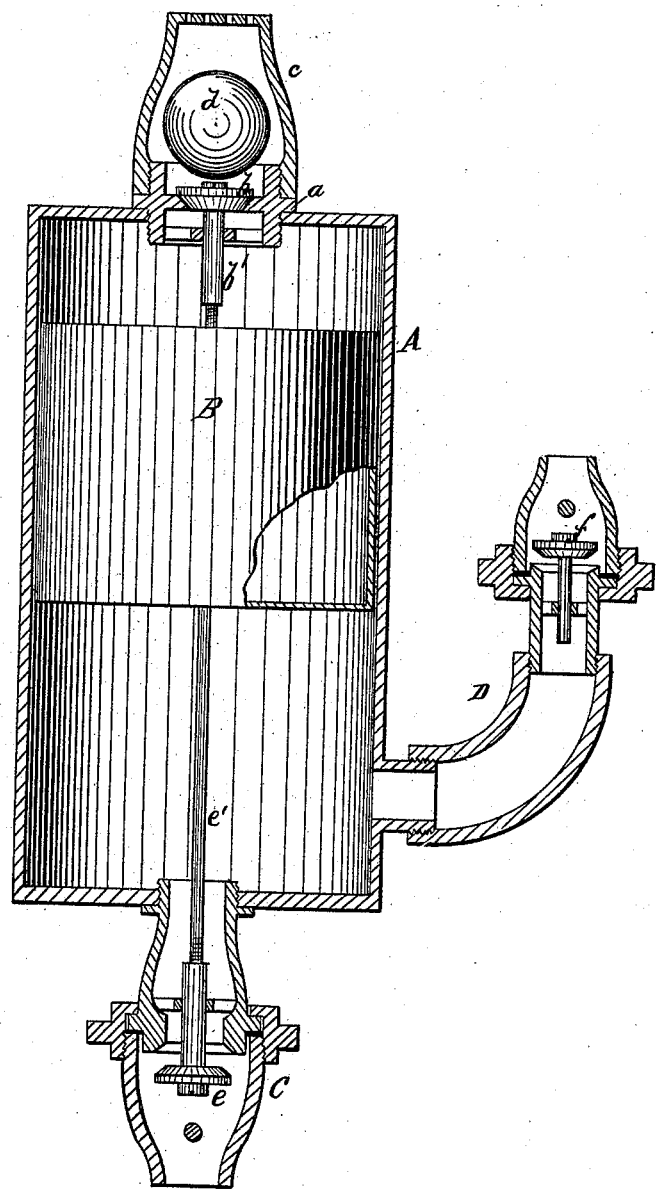
WITNESSES:
Henry N. Miller
C. Sedgwick
INVENTOR:
T. J. Smith
BY Munn & Co
ATTORNEYS.

UNITED STATES PATENT OFFICE.

THOMAS J. SMITH, OF NEW YORK, N. Y., ASSIGNOR OF ONE-HALF HIS RIGHT TO WILLIAM QUINN, OF SAME PLACE.

IMPROVEMENT IN SAFETY-REGULATORS FOR PUMPS AND WATER-PIPES.

Specification forming part of Letters Patent No. 214,463, dated April 15, 1879; application filed March 14, 1879.

*To all whom it may concern:*

Be it known that I, THOMAS J. SMITH, of the city, county, and State of New York, have invented a new and Improved Safety-Regulator for Pumps and Water-Pipes, of which the following is a specification.

My regulator is applied in connection with water-pipes in buildings, with the object, first, to avoid the necessity of a separate line of pipe from the water-level to the pump on each floor; and, secondly, to automatically shut off the connection to the street-main when the pressure of the water exceeds the usual point, and without preventing the use of the pumps while the increased pressure continues.

The invention consists in a hollow cylinder connected in the line of pipes and containing a float, which is acted upon by pressure of the water to close a valve and shut off the water. The float also operates an air-valve that admits air to enter the cylinder and open the water-valve when necessary.

The construction and operation will be explained in connection with the accompanying drawing, wherein the regulator is shown by a vertical longitudinal section.

Similar letters of reference indicate corresponding parts.

A is a cylinder, having within it a float, B, fitted to slide freely. The bottom of cylinder A is connected to the water-supply pipe C, and a pipe, D, leads to the pump, so that the water passes through cylinder A beneath float B. In the upper end of cylinder A is a ring, $a$, that is formed with a valve-seat for a disk-valve, $b$, which opens outward, and is connected by a stem, $b'$, with float B. The valve $b$ and the opening are covered by a cap, $c$, that is attached upon ring $a$, and is perforated at the top for admission of air. Within cap $c$ is an elastic ball-valve, $d$, which, when the regulator fails to work properly and water rises to the top of the cylinder, is pressed against the contracted sides of cap $c$, and prevents escape of water through the perforations of the cap. The valve $b$ prevents the pump from drawing in air.

The coupling-joint to water-pipe C is formed with a seat for a downwardly-opening disk-valve, $e$, that is connected by a stem, $e'$, with float B. The connection of valves $e$ and $b$ to their stems is made by a screw in any suitable manner, to permit their adjustment relatively to each other.

In the pipe D is fitted a check-valve, $f$.

The regulator described is positioned between the pump and water-supply at a point above or below the water-level. In most cases it will be above the level to which the water rises during the day, and when, by increased pressure during the night, the water rises into cylinder, the float will be raised, valve $e$ closed, and the water cut off. This action prevents flooding of buildings and waste of water from cocks which are left open. When the pressure of water is sufficient to close valve $e$, the pump may still be operated. In that case the first stroke will remove the water beneath float B and tend to create a vacuum. The air-pressure on the top of float B, acting upon a large area, will overcome the pressure of water on valve $e$, and open that valve for the water to enter.

In buildings having a pump on each floor it has been necessary to connect each pump with the water-level by a separate line of pipes, for the reason that if the cocks on a lower floor are left open water cannot be raised by pumps above. In such cases the regulator will be applied to each pump in a branch from a single rising pipe, and the pipe D of each regulator will connect to the pump. If an upper pump is then worked, the check-valve $f$ of the lower regulator will prevent access of air to the rising pipe.

I do not limit myself to the exact construction shown and described, as the regulator may be varied somewhat in details without departing from my invention.

Having thus fully described my invention, I claim as new and desire to secure by Letters Patent—

1. The combination, with water-supply pipes, of a regulating apparatus consisting of a cylinder, A, float B, and valve $e$, which valve is closed by water-pressure and opened by air-pressure, substantially as and for the purposes set forth.

2. The described regulator for water-supply pipes, consisting of the cylinder A, float B, and valves *e f*, combined and arranged together, and in connection with the supply and discharge pipes, substantially as described and shown.

3. The combination, with the regulator, constructed and operating substantially as described and shown, of the check-valve *f*, fitted in the discharge-pipe of the regulator, as set forth.

4. In combination with the cylinder A of an automatic regulator, the perforated cap *c* and valve *d*, as and for the purposes specified.

THOS. J. SMITH.

Witnesses:
C. SEDGWICK,
GEO. D. WALKER.